(12) United States Patent
Heyl

(10) Patent No.: US 12,703,375 B2
(45) Date of Patent: Aug. 11, 2026

(54) COMPUTER-IMPLEMENTED METHOD, PROCESSING DEVICE AND VEHICLE CONTROL DEVICE

(71) Applicant: Robert Bosch GmbH, Stuttgart (DE)

(72) Inventor: Andreas Heyl, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 18/823,774

(22) Filed: Sep. 4, 2024

(65) Prior Publication Data

US 2025/0091594 A1 Mar. 20, 2025

(30) Foreign Application Priority Data

Sep. 19, 2023 (DE) ..................... 10 2023 209 057.0

(51) Int. Cl.
*B60W 50/029* (2012.01)
*B60W 50/02* (2012.01)

(52) U.S. Cl.
CPC ...... *B60W 50/029* (2013.01); *B60W 50/0205* (2013.01); *B60W 2050/0215* (2013.01)

(58) Field of Classification Search
CPC ........... B60W 50/029; B60W 50/0205; B60W 2050/0215
USPC ........................................................ 701/29.2
See application file for complete search history.

(56) References Cited

U.S. PATENT DOCUMENTS

2021/0316755 A1* 10/2021 Liu ................... B60W 60/0015
2021/0339741 A1* 11/2021 Rezvan Behbahani ...................... B60W 30/0956
2023/0242147 A1* 8/2023 Odonnell .............. G01S 7/4039 701/23
2023/0356728 A1* 11/2023 Jain ......................... G06F 3/013

FOREIGN PATENT DOCUMENTS

DE 102012215343 A1 5/2014
DE 102013206707 A1 10/2014
DE 102016212326 A1 1/2018

OTHER PUBLICATIONS

International Standard ISO 26262-1 Road vehicles—Functional safety , Part 1: Vocabulary (2018), ISO 2018, pp. 1-42.
International Standard ISO 21448 Road vehicles—Safety of the intended functionality (2019), ISO/PAS, 2019, pp. 1-64.

* cited by examiner

*Primary Examiner* — Hitesh Patel
*Assistant Examiner* — John D Holman
(74) *Attorney, Agent, or Firm* — Norton Rose Fulbright US LLP

(57) ABSTRACT

A computer-implemented method for behavior planning of a vehicle, a processing device, and a vehicle control device.

14 Claims, 4 Drawing Sheets

20
34
22
14
12
26, 28
38, 40
16
30
10
24
36
70
18
32
first environmental sensor data
second environmental sensor data
V2X communication
42
44
50
48
46
first environmental model
fusion environmental model
second environmental model
52
set of safety rules
55
54
set of safety rules
55
72
76
64
intervention filtering
intervention measure
fault detection
74
state decision, capability detection
66, 68
56
56
56
action planning
58
60
vehicle control device
62

COMPUTER-IMPLEMENTED METHOD, PROCESSING DEVICE AND VEHICLE CONTROL DEVICE

CROSS REFERENCE

The present application claims the benefit under 35 U.S.C. § 119 of German Application No. DE 10 2023 209 057.0 filed on Sep. 19, 2023, which is expressly incorporated herein by reference in its entirety.

FIELD

The present invention relates to a computer-implemented method for behavior planning of a vehicle. The present invention further relates to a processing device and to a vehicle control device.

BACKGROUND INFORMATION

A two-channel redundancy architecture is available in automated vehicles. This architecture includes two processing paths, one of which uses for example a camera at the perception level, and the other uses a lidar sensor or radar sensor.

Each of these processing paths acts independently, continuously detects the vehicle's surroundings and processes the environmental sensor data with a mathematical model that, for example, takes into account the safety distance depending on the speed. The main objective is to identify potential hazards and obstacles and determine whether automatic intervention is necessary, for example to prevent collisions or to avoid driving too close.

A common characteristic feature of the redundancy architectures used today, especially with regard to highly automated vehicle systems, is their 1oo2 structure. This means that if one of the processing paths reports a false detection or false positive (FP), the system may tend to react proactively. These reactions could result in sudden braking maneuvers or, in extreme situations, even a complete stop of the vehicle.

In complex and dynamic traffic environments, such a rapid and possibly unexpected response can create risks. One example might be a scenario where a vehicle stops unexpectedly at a busy intersection, increasing the risk of a side-on collision with an oncoming vehicle.

Both false positive (FP) and false negative (FN) detections can lead to risky situations that occur more frequently compared to human drivers who have experience and intuition.

The 1oo2 redundancy architecture used in automated driving systems places particular emphasis on safety and is therefore designed to be more prone to intervention in order to minimize potential hazards. This highlights the need to consider both processing pathways equally, as neither is considered more dominant or reliable. The lack of a way to validate the intervention of one processing path as more trustworthy ensures that both processing paths are equal and fulfill their role in the overall functionality of the system.

SUMMARY

According to the present invention, a computer-implemented method for behavior planning of a vehicle is provided. The method includes a first processing with a first environmental detection of a first environment region of the vehicle, which includes at least one environmental object, using a first environmental sensor generating first environmental sensor data in this regard, a first environmental perception from the first environmental sensor data and a safety assessment of the first environmental perception by applying a set of safety rules; a second processing with a second environmental detection of a second environment region of the vehicle, which at least partially comprises the first environment region, using a second environmental sensor generating second environmental sensor data in this regard, a second environmental perception from the second environmental sensor data and a safety assessment of the second environmental perception by applying the set of safety rules; an output of at least one proposed operating parameter of the vehicle depending on the safety assessments; action planning which plans the operating parameter to be used based on the proposed operating parameter, wherein an intervention measure is included between at least one of the safety assessments and the action planning, which intervention measure, depending on a state detection, specifically influences the at least one proposed operating parameter that has been output.

It can avoid a safety-critical and dangerous vehicle maneuver. The set operating parameter may be more appropriate to the situation. The driving safety of the vehicle can be increased. Possible FP events can be identified and filtered out. Unnecessary braking or inappropriate minimal risk maneuvers can be avoided.

The vehicle can be a motor vehicle, a truck, a two-wheeled vehicle, a mobile robot or an industrial robot. The vehicle can assume at least a partially autonomous or autonomous operating state during driving.

The first environmental sensor can be a LIDAR sensor, a radar sensor, an ultrasonic sensor or a camera. The second environmental sensor can have a sensor category that differs from the first environmental sensor, in particular a different measuring principle. The second environmental sensor can be a LIDAR sensor, a radar sensor, an ultrasonic sensor or a camera. If the first environmental sensor is a camera, the second environmental sensor is preferably a radar sensor, LIDAR sensor or ultrasonic sensor.

The first and/or second surrounding region of the vehicle can include, preferably exclusively, the immediate surroundings of the vehicle. The second surrounding region may spatially overlap mainly with the first surrounding region.

The first and second processing can form a 1oo2 redundancy architecture.

According to an example embodiment of the present invention, during the first and/or second environmental detection, raw data from the physical environment can be collected using the relevant environmental sensor. The capability, reliability and/or integrity of the first and/or second environmental detection may depend on range, resolution and/or weather conditions. The first and/or second environmental detection can at least partially include the processing of the first and second environmental sensor data, respectively. In this regard, ASIL (automotive safety integrity level) according to ISO 26262, which refers to the probability that internal processing will fail due to an electrical/electronic fault, may be applicable.

The environmental object can be a building, a living being, a device, an object, another vehicle, a plant or a road condition.

According to an example embodiment of the present invention, the first environmental perception can process and interpret the first environmental sensor data provided by the first environmental sensor. The second environmental perception can process and interpret the second environmental sensor data provided by the second environmental sensor. This may include attempting to understand the meaning of the information contained in the first and/or second environmental sensor data about the first and/or second environment region and the at least one environmental object. For example, it can be detected whether the surrounding object is a car, a pedestrian or a bicycle and/or whether it is moving or stationary. Machine learning and computer vision techniques can be used in the first and/or second environmental perception, in particular to recognize patterns in the first or second environmental sensor data and/or to correctly classify the at least one environmental object. The goal of the first and/or second environmental perception is a reliable and accurate real-time representation of the environment. The first and/or second environmental perception can comprise object detection and/or object tracking of at least the environmental object.

According to an example embodiment of the present invention, with the first perception of the environment, a first model of the environment can be created. With the second environmental perception, a second environmental model can be created. The first and/or second environmental model may be a real-time representation of the first or second environment region, respectively. The first and/or second environmental model may comprise an environmental map or a 3D model of the first or second environment region, respectively. The first and/or second environmental model may contain information about stationary environmental objects (e.g., buildings, trees, roads) and/or about moving objects (e.g., other vehicles, pedestrians, animals) in the first or second environment region, respectively.

In addition to the first and second environmental model, a fusion environmental model can be created from the first and/or second environmental detection.

According to an example embodiment of the present invention, the proposed and/or planned operating parameter to be used may be an emergency operating parameter of an emergency operating situation which is used in a fallback solution to maximize driving safety, for example in a minimal risk maneuver. The planned emergency operating situation may concern the current situation or future situations. The proposed and/or planned operating parameter to be applied may be the operating parameter to be set at an initial point in time.

According to an example embodiment of the present invention, the behavior planning may include or be a vehicle behavior planning of a vehicle behavior of the vehicle and/or a trajectory planning of a vehicle trajectory of the vehicle.

The action planning can be part of vehicle behavior planning of a vehicle behavior and/or trajectory planning of a vehicle trajectory. The action planning can be vehicle behavior planning and/or trajectory planning.

The operating parameter can be a vehicle parameter, a driving operation parameter of a driving operation of the vehicle and/or a movement parameter of the vehicle. The operating parameter can actually be adjustable and/or changed by at least one actuator. The operating parameter can be a longitudinal velocity, longitudinal acceleration, lateral velocity, lateral acceleration, a vehicle pose and/or a vehicle position. The operating parameter can be a signal, in particular an optical, acoustic and/or vibrating signal. The operating parameter can include a sequence of actions of a plurality of operating parameters. The proposed operating parameter can be a target value of the planned operating parameter.

The set of safety rules can be a responsibility-sensitive safety model (RSS or TTC for time-to-collision), in particular a mathematical safety model, in particular the evaluation of which is comprehensible and justifiable.

The intervention measure may affect the output of the proposed operating parameter and/or the operating parameter itself. For example, the intervention measure can delay, reject or allow the output of the proposed operating parameter. The intervention measure may change an amount and/or a gradient of the proposed operating parameter. The intervention measure may set the intervention to the proposed operating parameter of the safety assessment

- in a rule-based manner, for example by directly inferring from detected external and internal conditions their effect on the performance of the individual processing, for example FP in the radar due to heavy rain, heat rollers, reflective elements that can be driven over such as rails or manhole covers, ramps and others ("phantom braking"),
- with calculation of confidence or uncertainty metrics, for example covariance (Bayes filter), plausibility (possibility theory), belief (Dempster-Shafer theory) and their comparison against a limit value,
- by established rules,
- by at least one lookup table and/or
- in an Ai-based manner, for example by applying deep neural network, foundation model or other ML models.

The intervention measure can be integrated in the sequence between the safety assessments and the action planning.

In a preferred example embodiment of the present invention, it is advantageous if the state detection includes a capability detection of detection capabilities of the first environmental detection, the second environmental detection, the first environmental perception and/or the second environmental perception. Capability detection may include a capability assessment of the first and second environmental sensors, in particular via diagnostic functions. Capability detection can detect

- electronic, electrical faults or conditions of the environmental sensors, a diagnosis of the environmental sensors,
- physical conditions, such as temperatures or alignment errors or obscurations, such as by leaves and/or
- performance-limiting influences, in particular potential triggering conditions according to ISO 21448, such as weather conditions, restricted visibility, light conditions, reflections or obscurations.

Capability detection can obtain information from

- the environmental sensors, the sensor electronics of the environmental sensors and/or the control units,
- other vehicle sensors, especially the rain sensor, light sensor, the environmental map, for example with known geolocal function-limiting conditions and/or
- a V2X communication, for example from other road users, the traffic infrastructure, edge or cloud.

Capability assessment can comprise at least two properties of the processing, in particular of the perception system, namely integrity (AIL according to ISO 26262) and confidence or uncertainty (uncertainty as a metric, performance limitation according to ISO 21448).

In a preferred example embodiment of the present invention, it is advantageous if the intervention measure comprises intervention filtering for filtering the output proposed operating parameter. The intervention measure can be intervention filtering. The intervention measure can decide whether the proposed operating parameter is output. The intervention measure can be carried out based on a comparison of the safety assessment of the first environmental perception and the safety assessment of the second environmental perception. If the safety assessment results of both processing operations match, the proposed operating parameter can be output according to the safety assessment. If the safety assessments differ, the intervention measure may evaluate the results depending on the state detection.

The intervention measure can specifically allow, block, temporarily block or temporarily allow or modify, in particular weaken, the proposed operating parameter that has been output.

A preferred example embodiment of the present invention is advantageous in which the state detection includes fault detection and/or functional limitation detection in the first environmental detection, the second environmental detection, the first environmental perception and/or the second environmental perception. The fault detection can detect an electrical and/or electronic fault. The functional limitation detection can detect a functional limitation of the first environmental detection, the second environmental detection, the first environmental perception and/or the second environmental perception.

The fault detection and/or functional limitation detection can use diagnostic results of the first environmental detection, the second environmental detection, the first environmental perception and/or the second environmental perception. The fault detection and/or functional limitation detection can evaluate external and/or internal conditions.

In a special embodiment of the present invention, it is advantageous if the intervention measure comprises a temporal output delay of the output of the proposed operating parameter to the action planning. The output delay can be a delay of a fault reaction, i.e., a fault debouncing.

In a preferred embodiment of the present invention, it is provided for the state detection to take into account currently existing safety requirements for the first and/or second environmental perception and for the duration of the output delay to be determined depending on the safety requirements. The duration of the output delay can be set depending on an assessment of the current vehicle situation.

The safety requirements can result from the current scenario as functional limits that must not be exceeded, for example distances to vehicles or the edge of the road. The safety requirements can be formed by information about a vehicle condition, such as vehicle speed or distance to a vehicle ahead,

- from the first environmental model, the second environmental model and/or the fusion environmental model,
- from an environmental map, for example the presence of traffic lights, traffic signs on the route ahead and/or from V2X information, for example from other road users, in particular other vehicles and/or a traffic infrastructure.

In an advantageous example embodiment of the present invention, it is provided for the intervention measure to cause a use of a third processing with a third environmental detection, a third environmental perception, a safety assessment of the third environmental perception by applying the set of safety rules and an output of the proposed operating parameter depending on the safety assessment including the third environmental perception. This can compensate for the temporary failure of a processing by temporarily bridging the gap with the third processing. The third environmental detection can be obtained by further vehicle sensors, for example ultrasonic sensors and/or at least one IR camera, by a vehicle interface, in particular CAN, connected expansion modules and/or by V2X communication. V2X communication can take place with an external system (e.g., edge, cloud, road-side unit), which in turn can generate an environmental model (e.g., with infrastructure sensors or by merging the sensors of a plurality of V2X vehicles in the vicinity).

The state detection and/or the intervention measure can be carried out in a central control unit of the vehicle.

In a special example embodiment of the present invention, it is advantageous if the intervention measure includes the third processing and discards the first and/or second processing identified as faulty or unreliable by the state detection. This makes it possible to temporarily bridge the faulty or unreliable processing.

According to the present invention, a processing device for a vehicle is further provided, which processing device is configured to carry out the computer-implemented method for behavior planning having at least one of the features described above according to the present invention. The processing device can comprise at least one processor for at least partially executing the computer-implemented method.

According to the present invention, a vehicle control device for a vehicle is further proposed, which vehicle control device is configured to set the operating parameter to be used as planned using a computer-implemented method having at least one of the features described above according to the present invention. The vehicle control device can be a control unit or part of a control unit.

At least one method step of the computer-implemented method can be performed inside the vehicle by edge computing and/or outside the vehicle by cloud computing. At least one method step of the computer-implemented method can be processed by machine learning. The machine learning can apply a neural network. The machine learning can include reinforcement learning.

The present invention further relates to a non-transitory, computer-readable medium containing instructions, the execution of which causes at least one processor to execute said computer-implemented method having at least one previously described feature.

Further advantages and advantageous embodiments of the present invention can be found in the description of the figures and in the figures.

BRIEF DESCRIPTION OF THE DRAWINGS

The present invention is described in detail below with reference to the figures.

DETAILED DESCRIPTION OF EXAMPLE EMBODIMENTS

Figure 1:
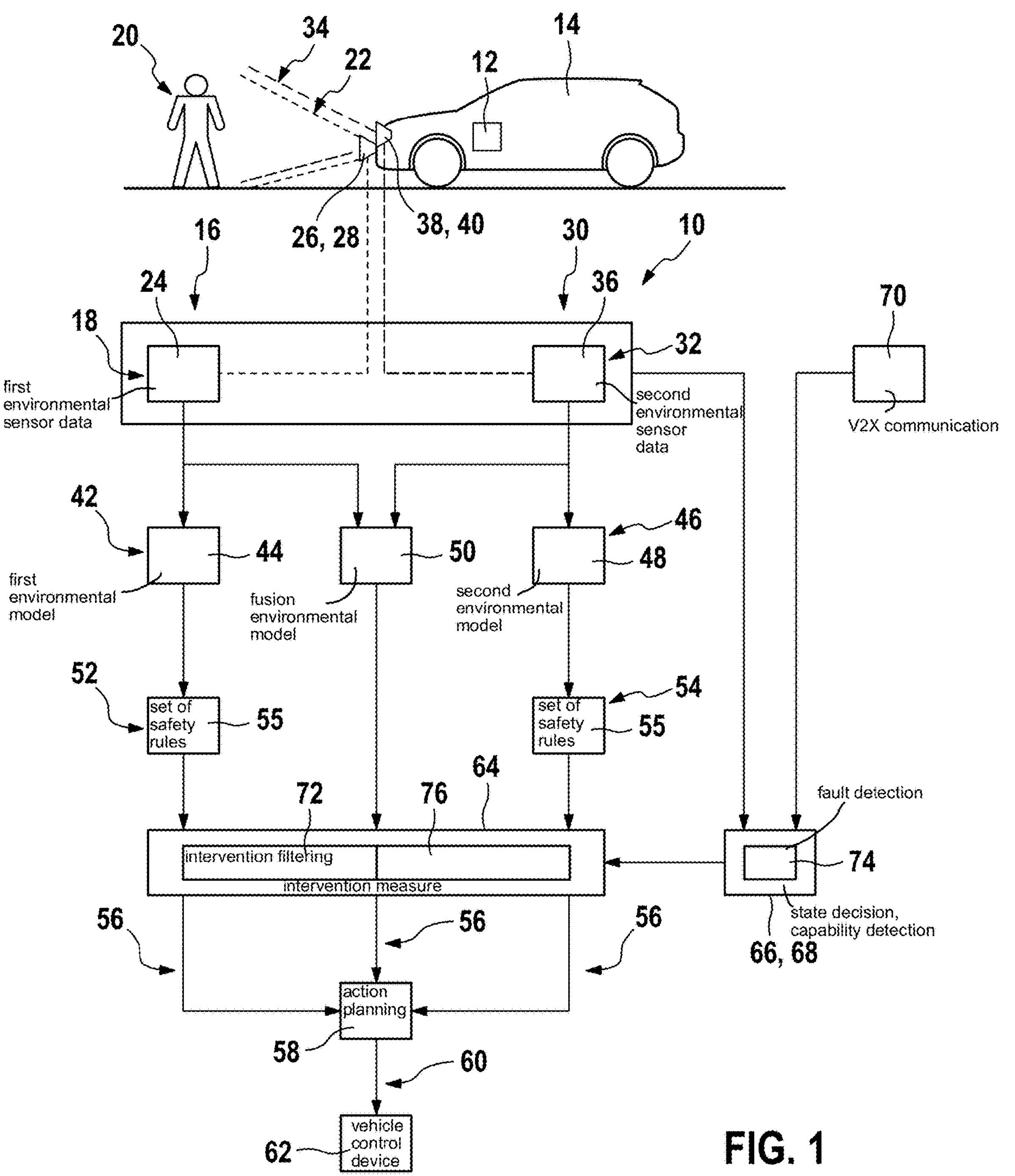
FIG. 1 shows a computer-implemented method in a special example embodiment of the present invention.

FIG. 1 shows a computer-implemented method in a special embodiment of the present invention. The computer-implemented method 10 for behavior planning of a vehicle can be carried out by a processing device 12 of the vehicle 14 and comprises a first processing 16 with a first environmental detection 18 of a first environment region 22 of the vehicle 14, which includes at least one environmental object 20, using a first environmental sensor 26 generating first environmental sensor data 24 in this regard. The first environmental sensor 26 is, for example, a camera 28. Furthermore, a second processing 30 is set up with a second environmental detection 32 of a second environment region 34 of the vehicle 14, which at least partially comprises the first environment region 22, using a second environmental sensor 38 generating second environmental sensor data 36. The second environmental sensor 38 is, for example, a lidar sensor and/or radar sensor 40. The second surrounding region 34 spatially overlaps in particular mainly with the first surrounding region 22.

The first and second processing 16, 30 can preferably form a two-channel redundancy architecture.

A subsequent first environmental perception 42 including a creation of a first environmental model 44 from the first environmental sensor data 24 and a second environmental perception 46 including a creation of a second environmental model 48 from the second environmental sensor data 36 is also accompanied by the creation of a fusion environmental model 50, which is created from the first and second environmental detections 18, 32.

In a subsequent safety assessment 52 of the first environmental perception 42 and a safety assessment 54 of the second environmental perception 46, a set of safety rules 55 is applied in each case. The set of safety rules 55 can be a responsibility-sensitive safety model (RSS, TTC), in particular a mathematical safety model, the evaluation of which is comprehensible and justifiable.

At least one proposed operating parameter 56 of the vehicle 14 is output based on the safety assessments 52, 54. For example, the safety assessment 52 can output a proposed operating parameter 56 corresponding to braking the vehicle 14 to avoid a collision or driving too close to a vehicle 14 ahead.

This is followed by action planning 58, which plans the operating parameter 60 to be used, for example the braking operation, based on the proposed operating parameter 56. The planned operating parameter 60 to be used can be set by a vehicle control device 62.

An Intervention measure 64 Is IIed between the safety assessments 52, 54 and the action planning 58, which intervention measure, depending on a state detection 66, specifically influences the at least one proposed operating parameter 56 that has been output. The state detection 66 is in particular a capability detection 68 of detection capabilities of the first and second environmental detections 18, 32 and/or the first and second environmental perceptions 42, 46. Information from other vehicle sensors or through V2X communication 70 can be included in the state detection 66. For example, the capability detection 68 may include a capability assessment of the first and second environmental sensors 26, 38 via diagnostic functions.

The Intervention measure 64 may IIe Intervention filtering 72 for filtering the proposed operating parameter 56 to be output. The operating parameters proposed by the safety assessments 52, 54 can be filtered. In particular, the intervention measure 64 can decide whether the operating parameter proposed by the safety assessments 52, 54 is approved and output as a proposed operating parameter 56.

Alternatively or additionally, the state detection 66 may include a fault detection 74 and/or functional limitation detection in the first environmental detection 18, the second environmental detection 32, the first environmental perception 42 and/or the second environmental perception 46. Alternatively or additionally, the intervention measure 64 may include a temporal output delay 76 of the output of the proposed operating parameter 56 to the action planning 58. The state detection 66 can obtain currently existing safety requirements, for example from other vehicle sensors or a V2X communication 70, and the duration of the output delay 76 can be set based on the safety requirements.

Figure 2:
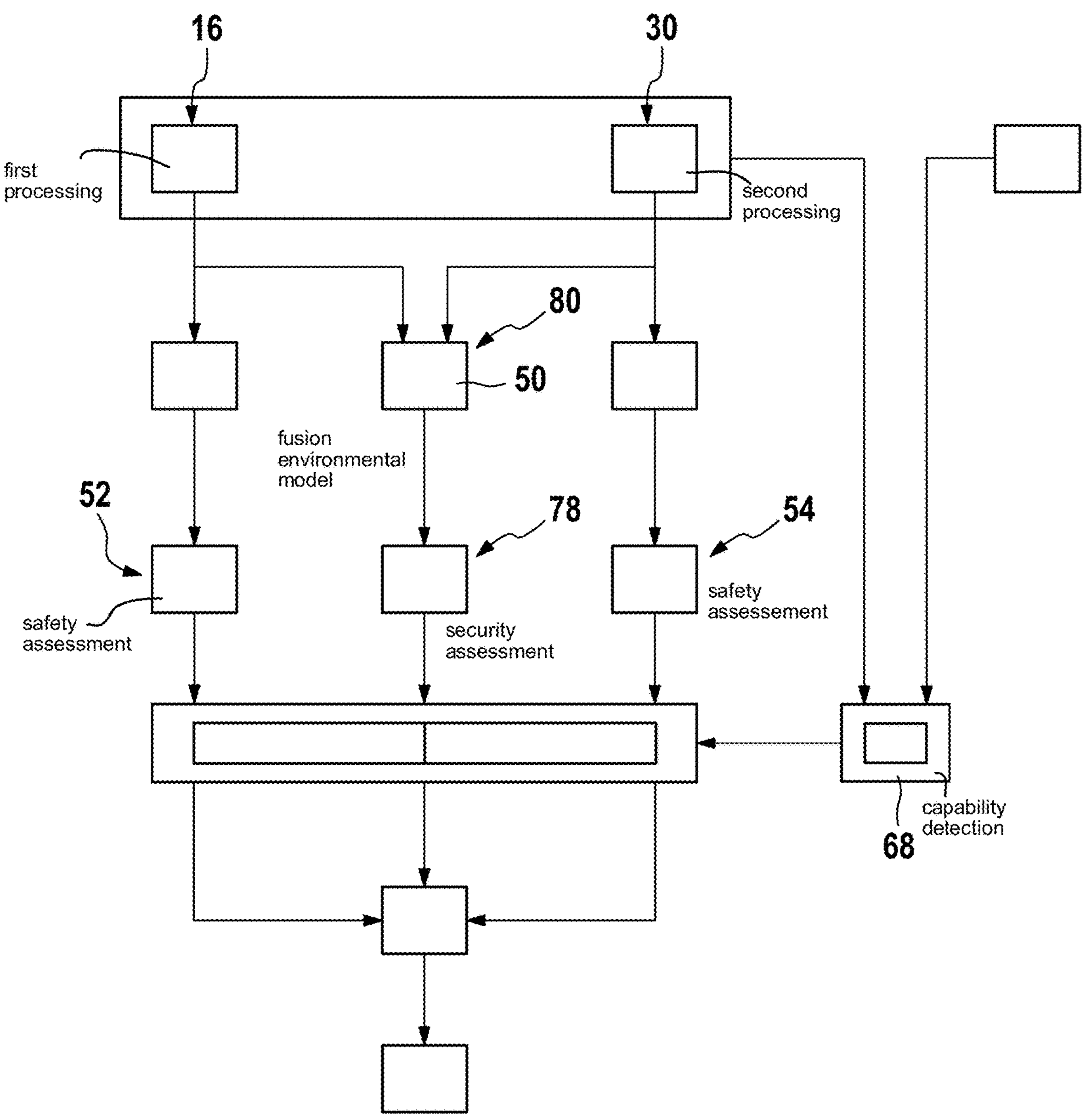
FIG. 2 shows a computer-implemented method in another special example embodiment of the present invention.

FIG. 2 shows a computer-implemented method in another special embodiment of the invention. The computer-implemented method is similar to that of FIG. 1, except for the following differences. In the case of contradictory security assessments 52, 54, an additional security assessment 78 based on the fusion environmental model 50 is included compared to the embodiment in FIG. 1, for example as further processing 80 in the case of a 2003 majority decision. Based on the capability assessment 68 of the three processings 16, 30, 80, this decision could possibly also be made with additional weighting.

Figure 3:
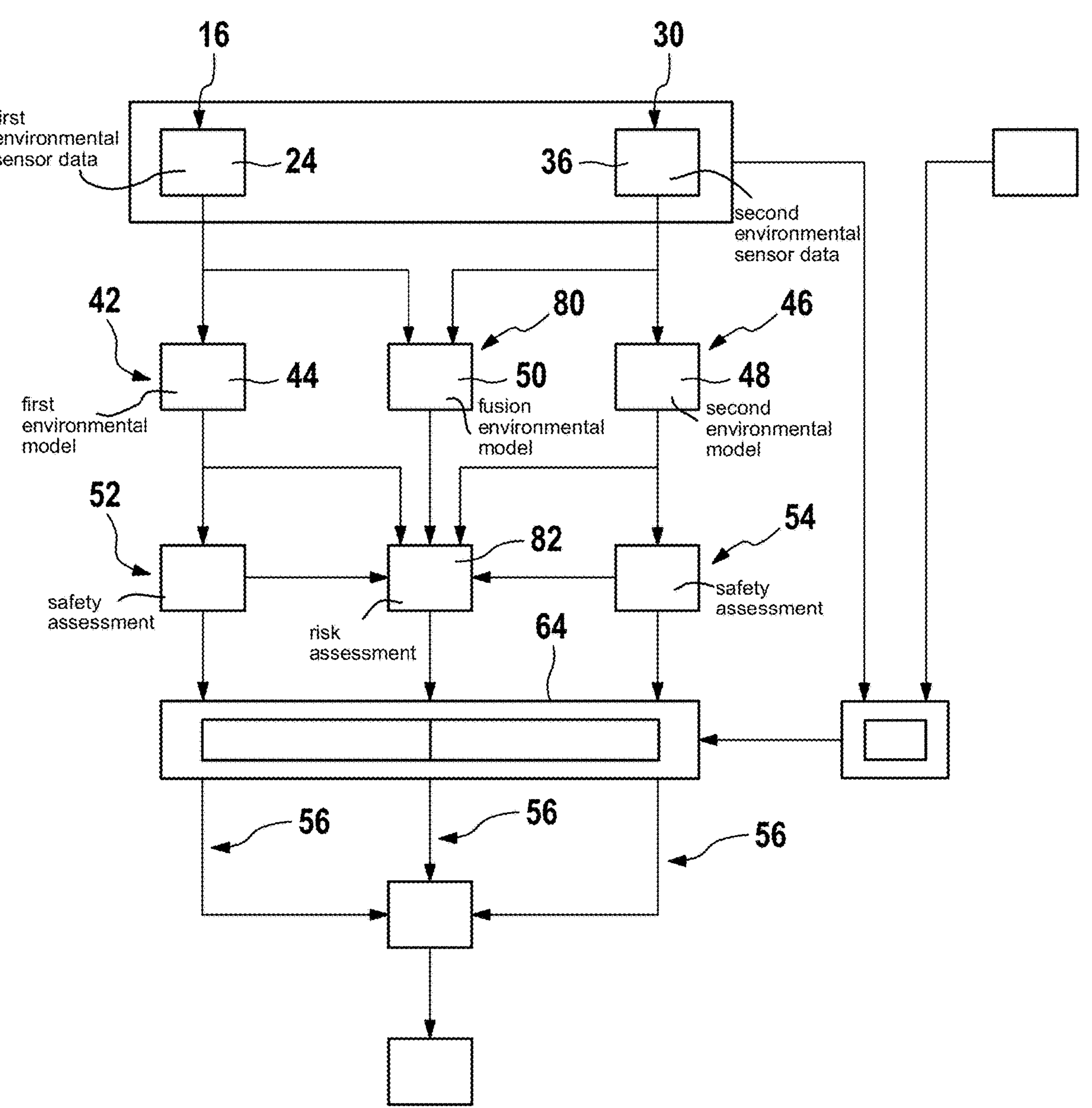
FIG. 3 shows a computer-implemented method in another special example embodiment of the present invention.

FIG. 3 shows a computer-implemented method in another special embodiment of the invention. The computer-implemented method is similar to that of FIG. 1, except for the following differences. In the case of conflicting safety assessments 52, 54 of the first and second environmental perceptions 42, 46, a risk assessment 82 of the (estimated) risks associated with the relevant decision on the proposed operating parameter is additionally carried out, in particular on the basis of the first and second environmental models 44, 48 and the fusion environmental model 50. In this case, considering the relative risk may be sufficient.

For example, the risk of a false positive (FP) could be shown as the product of the probability of a false positive and the severity of the accident resulting from the reaction. The risk of a true positive (TP) could be calculated as the product of the probability of a true positive and the severity of the accident resulting from non-reaction. The probability of a true or false positive results from the capability assessment of the first and second processing 16, 30 and the further processing 80 and their probabilistic results. These could, for example, be the probability of existence of an environmental object calculated from the first and second environmental sensor data 24, 36, which was used for the safety assessments 52, 54 and which could now also be made available to the intervention measure 64.

The severity of the accident results from the prediction of the first and second environmental model 44 48 (e.g., other surrounding objects) and the vehicle's own movement (depending on the reaction or decision), i.e., on the basis of a "classical" collision estimation.

Here is a first example:

If the probability of an environmental object in front of the vehicle is 0.5 and of an environmental object behind the vehicle is 0.9, and the severity of the accident in case of non-braking is 100 with respect to the environmental object in front of the vehicle and the severity of the accident in case of braking is 20 with respect to the environmental object behind the vehicle, then the risk of non-braking is 50 and the risk of braking is 18. With this calculated risk, the proposed operating parameter of the safety assessment 52 associated with braking is approved by the intervention measure 64.

A second example:

If the probability of an environmental object in front of the vehicle is 0.3 and of an environmental object behind the vehicle is 0.9, and the severity of the accident in case of non-braking is 100 with respect to the environmental object in front of the vehicle and the severity of the accident in case of braking is 50 with respect to the environmental object behind the vehicle, then the risk of non-braking is 30 and the risk of braking is 45. With this calculated risk, the proposed operating parameter of the safety assessment 52 associated with braking is not approved by the intervention measure 64.

The intervention measure 64 also makes it possible to detect, in the first and second environmental perceptions 42, 46, matching FP events or FN events that occur temporarily, and to suitably influence the proposed operating parameter 56 to be output.

Figure 4:
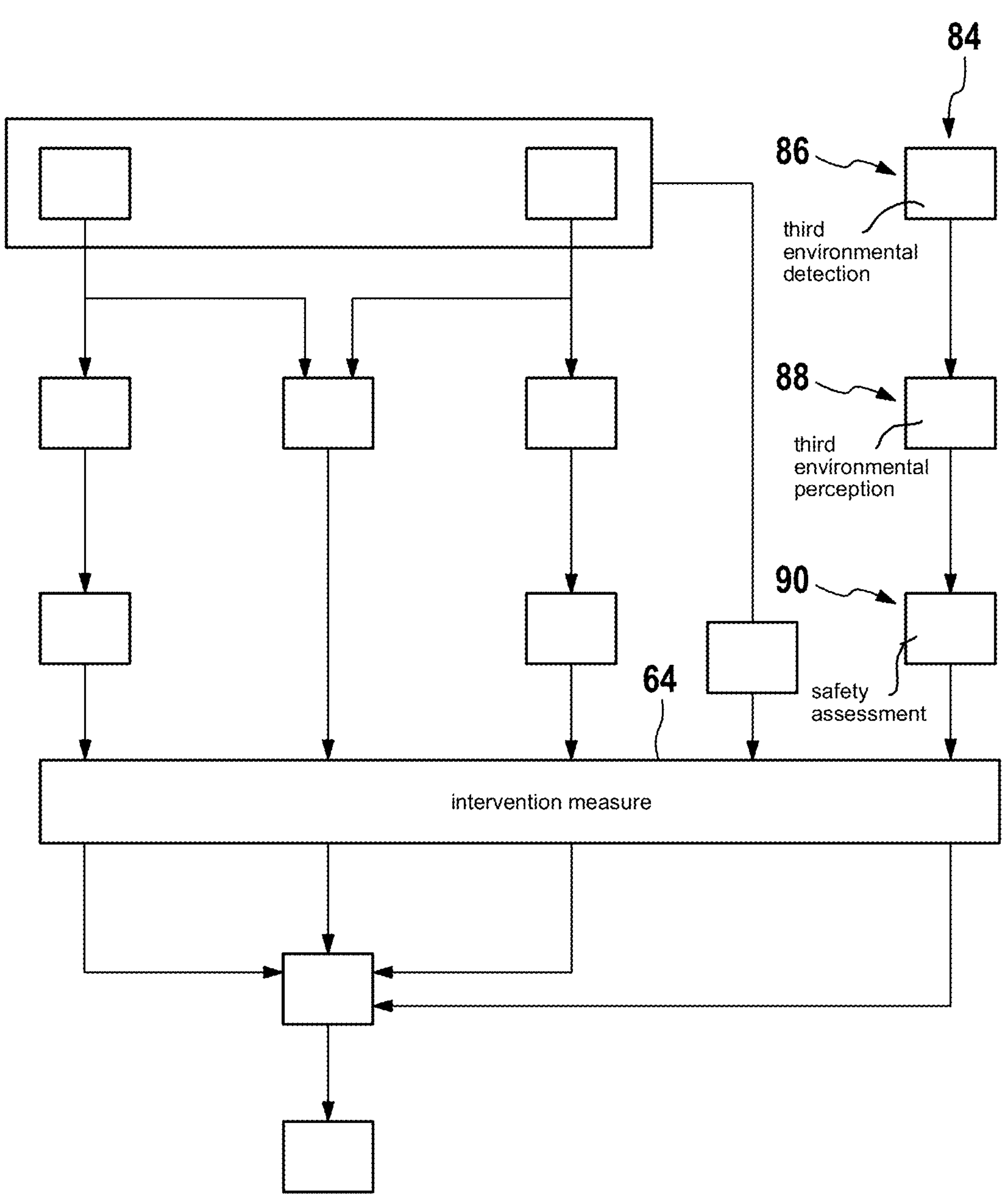
FIG. 4 shows a computer-implemented method in another special example embodiment of the present invention.

FIG. 4 shows a computer-implemented method in yet another special embodiment of the invention. The computer-implemented method is similar to that of FIG. 1, except for the following differences. The intervention measure 64 causes the use of a third processing 84 with a third environmental detection 86, a third environmental perception 88, a safety assessment 90 of the third environmental perception 88 by applying the set of safety rules 55 and an output of the proposed operating parameter depending on the safety assessment 90 that includes the third environmental perception 88. The third environmental detection 86 can be carried out via further vehicle sensors, for example ultrasonic sensors and/or at least one IR camera.

What is claimed is:

1. A computer-implemented method for behavior planning of a vehicle, the method comprising:

- a first processing including: (i) a first environmental detection of a first environment region of the vehicle, which includes at least one environmental object, using a first environmental sensor generating first environmental sensor data, (ii) a first environmental perception from the first environmental sensor data, the first environmental perception including a first object detection, and (iii) a safety assessment of the first environmental perception by applying a set of safety rules;
- a second processing including: (i) a second environmental detection of a second environment region of the vehicle, which at least partially includes the first environment region, using a second environmental sensor generating second environmental sensor data, (ii) a second environmental perception from the second environmental sensor data, the second environmental perception including a second object detection, and (iii) a safety assessment of the second environmental perception by applying the set of safety rules;
- outputting at least one proposed operating parameter of the vehicle depending on the safety assessments of the first and second environmental perceptions, the at least one proposed operating parameter being an operating parameter for an emergency vehicle maneuver;
- performing a risk assessment of the at least one proposed operating parameter taking into account a probability of a false positive object detection corresponding to the first object detection and a probability of a false positive object detection corresponding to the second object detection;
- action planning including planning an operating parameter to be used based on the at least one proposed operating parameter;
- wherein an intervention measure is included between at least one of the safety assessments of the first and second environmental perceptions and the action planning, the intervention measure, depending on a state detection and the risk assessment, specifically influencing the at least one proposed operating parameter that has been output.

2. The computer-implemented method according to claim 1, wherein the state detection includes a capability detection of detection capabilities of the first environmental detection and/or the second environmental detection and/or the first environmental perception and/or the second environmental perception.

3. The computer-implemented method according to claim 1, wherein the intervention measure includes intervention filtering for filtering the proposed operating parameter.

4. The computer-implemented method according to claim 1, wherein the state detection includes a fault detection and/or functional limitation detection in the first environmental detection and/or the second environmental detection and/or the first environmental perception and/or the second environmental perception.

5. The computer-implemented method according to claim 1, wherein the intervention measure includes a temporal output delay of the outputting of the proposed operating parameter to the action planning.

6. The computer-implemented method according to claim 5, wherein the state detection obtains currently existing safety requirements for the first and/or second environmental perception, and a duration of the output delay is determined depending on the safety requirements.

7. The computer-implemented method according to claim 1, wherein the intervention measure causes a use of a third processing including: (i) a third environmental detection, (ii) a third environmental perception, (iii) a safety assessment of the third environmental perception by applying the set of safety rules, and (iv) an output of the proposed operating parameter depending on the safety assessment including the third environmental perception.

8. The computer-implemented method according to claim 7, wherein the intervention measure includes the third processing and discards the first and/or second processing identified as faulty or unreliable by the state detection.

9. The computer-implemented method according to claim 1, wherein the set of safety rules correspond to a responsibility-sensitive safety (RSS) model or a time-to-collision (TTC) model.

10. The computer-implemented method according to claim 1, wherein the risk assessment determines a first collision risk for the vehicle when the emergency vehicle maneuver is executed using the proposed operating parameter and a second collision risk for the vehicle when the emergency vehicle maneuver is not executed.

11. The computer-implemented method according to claim 1, wherein the probability of the false positive object detection corresponding to the first object detection is determined using an uncertainty metric associated with the first environmental perception.

12. The computer-implemented method according to claim 1, wherein the probability of the false positive object detection corresponding to the second object detection is determined using an uncertainty metric associated with the second environmental perception.

13. A processing device for a vehicle, the processing device configured for behavior planning of a vehicle, the processing device configured to perform:

- a first processing including: (i) a first environmental detection of a first environment region of the vehicle, which includes at least one environmental object, using a first environmental sensor generating first environmental sensor data, (ii) a first environmental perception from the first environmental sensor data, the first environmental perception including a first object detection, and (iii) a safety assessment of the first environmental perception by applying a set of safety rules;
- a second processing including: (i) a second environmental detection of a second environment region of the vehicle, which at least partially includes the first environment region, using a second environmental sensor generating second environmental sensor data, (ii) a second environmental perception from the second environmental sensor data, the second environmental perception including a second object detection, and (iii) a safety assessment of the second environmental perception by applying the set of safety rules;

outputting at least one proposed operating parameter of the vehicle depending on the safety assessments of the first and second environmental perceptions, the at least one proposed operating parameter being an operating parameter for an emergency vehicle maneuver;

performing a risk assessment of the at least one proposed operating parameter taking into account a probability of a false positive object detection corresponding to the first object detection and a probability of a false positive object detection corresponding to the second object detection;

action planning including planning an operating parameter to be used based on the at least one proposed operating parameter;

wherein an intervention measure is included between at least one of the safety assessments of the first and second environmental perceptions and the action planning, the intervention measure, depending on a state detection and the risk assessment, specifically influencing the at least one proposed operating parameter that has been output.

14. A vehicle control device for a vehicle, which vehicle control device is configured to set an operating parameter of the vehicle to be applied as planned using a computer-implemented method, the computer-implemented method comprising:

a first processing including: (i) a first environmental detection of a first environment region of the vehicle, which includes at least one environmental object, using a first environmental sensor generating first environmental sensor data, (ii) a first environmental perception from the first environmental sensor data, the first environmental perception including a first object detection and (iii) a safety assessment of the first environmental perception by applying a set of safety rules;

a second processing including: (i) a second environmental detection of a second environment region of the vehicle, which at least partially includes the first environment region, using a second environmental sensor generating second environmental sensor data, (ii) a second environmental perception from the second environmental sensor data, the second environmental perception including a second object detection and (iii) a safety assessment of the second environmental perception by applying the set of safety rules;

outputting at least one proposed operating parameter of the vehicle depending on the safety assessments of the first and second environmental perceptions, the at least one proposed operating parameter being an operating parameter for an emergency vehicle maneuver;

performing a risk assessment of the at least one proposed operating parameter taking into account a probability of a false positive object detection corresponding to the first object detection and a probability of a false positive object detection corresponding to the second object detection;

action planning including planning the operating parameter to be used based on the at least one proposed operating parameter;

wherein an intervention measure is included between at least one of the safety assessments of the first and second environmental perceptions and the action planning, the intervention measure, depending on a state detection and the risk assessment, specifically influencing the at least one proposed operating parameter that has been output.

* * * * *